June 24, 1930.  C. A. FRANKENHOFF  1,767,523
FILTER COVER
Filed July 8, 1929   3 Sheets-Sheet 1
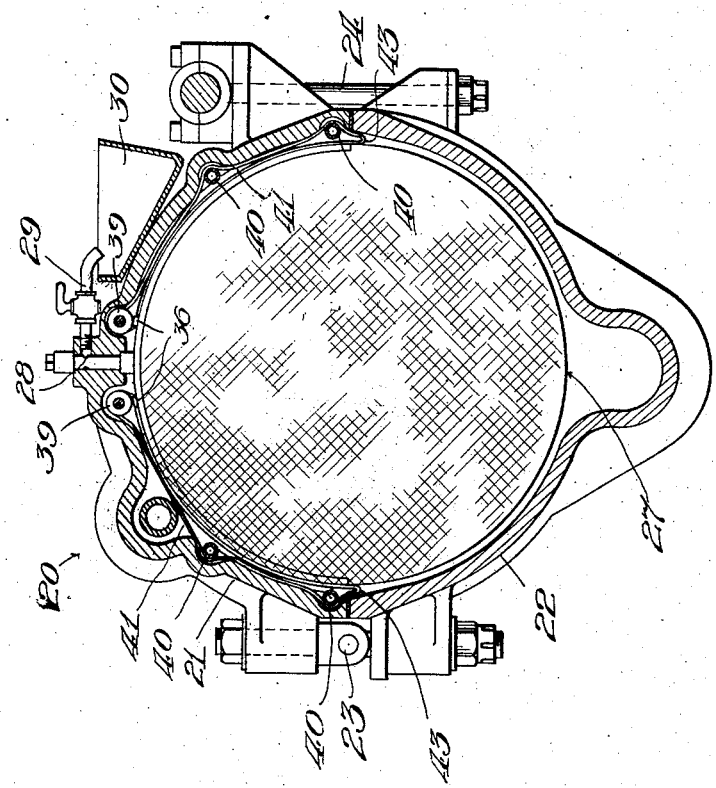
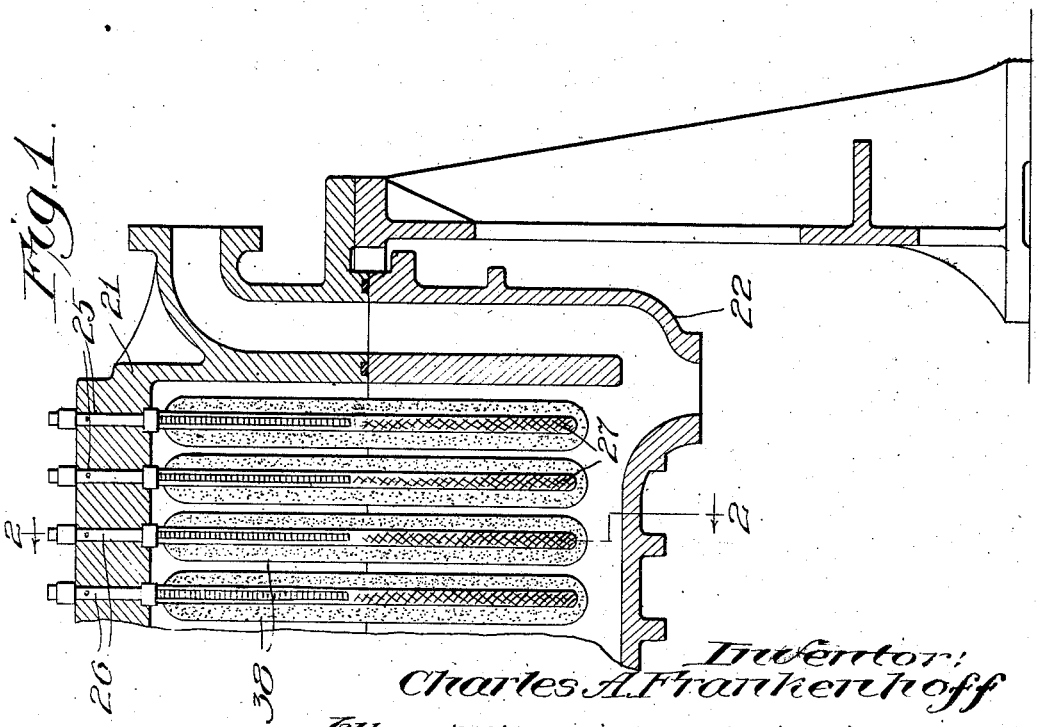
Inventor:
Charles A. Frankenhoff
By Rector, Hibben, Davis & Macauley
Attys

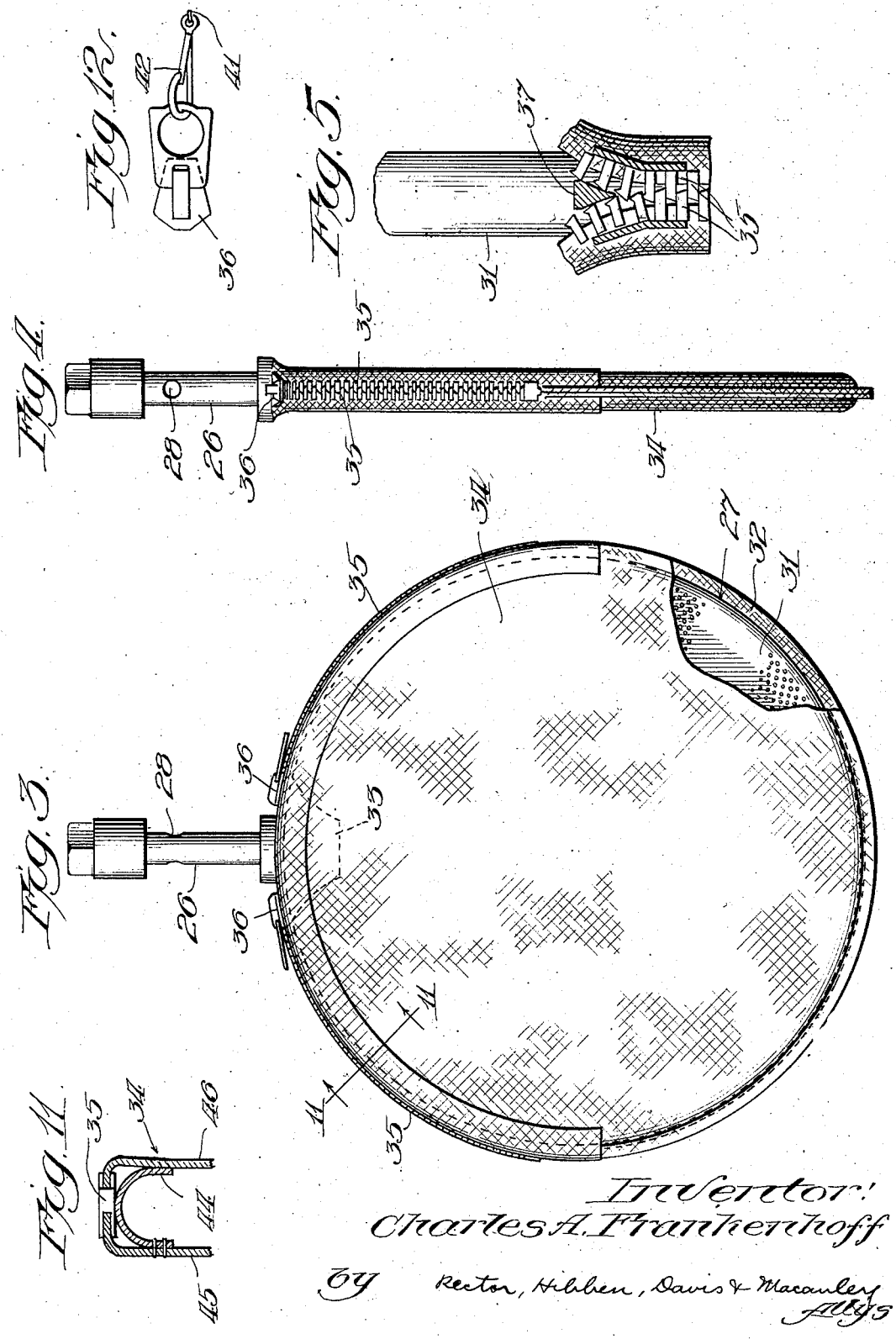

June 24, 1930. C. A. FRANKENHOFF 1,767,523
FILTER COVER
Filed July 8, 1929 3 Sheets-Sheet 3
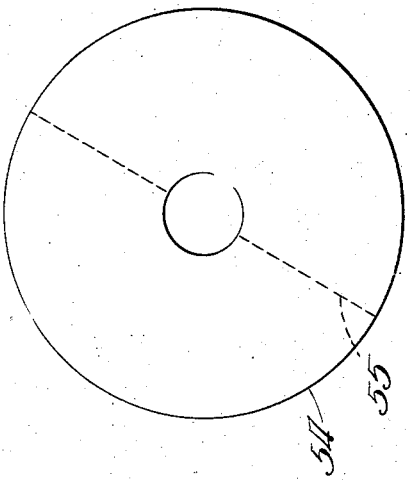
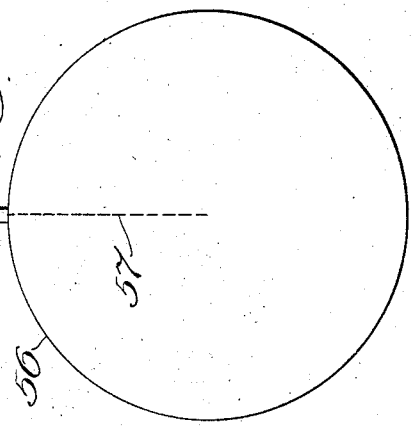
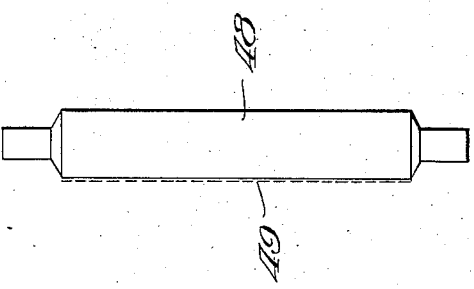
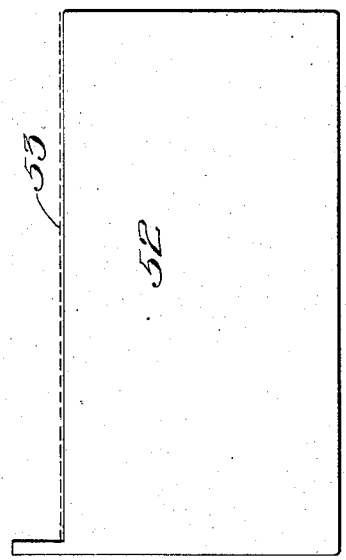
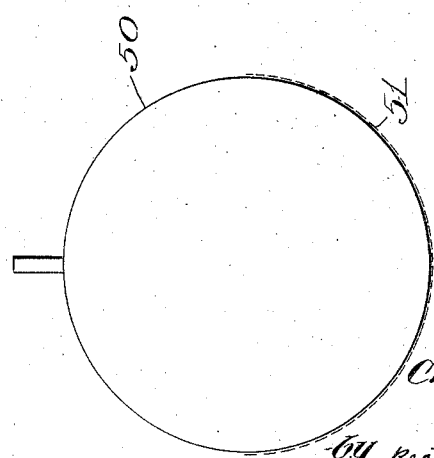
Inventor:
Charles A. Frankenhoff
by Rector, Hibben, Davis & Macauley
Attys Patented June 24, 1930

1,767,523

UNITED STATES PATENT OFFICE

CHARLES A. FRANKENHOFF, OF EVANSTON, ILLINOIS

FILTER COVER

Application filed July 8, 1929. Serial No. 376,642.

My invention relates to filter covers.

The principal object of my invention is to provide a filter cover for the filter leaves or elements used in filters or thickeners of various types, which is arranged to permit its application to and removal from the leaves or elements without necessitating the dismantling of the latter from the main filter or thickener structure.

A further object is to provide a cover of the character described which embodies a simple arrangement for securing an easy and rapid application to and removal from the filter leaves or elements while the latter are in position, whereby the cover may be removed for washing at intervals with a minimum loss in operative time of the main structure.

In its broadest aspects, the present invention is inclusive of filter covers generally, whether formed of metal, cotton, or of any fabricated filtering material and whether utilized in connection with stationary or rotary types of filters, those operating under pressure or a vacuum, or with the filter elements of a thickener structure. For purpose of illustration, however, the cover will be described as applied to the stationary leaves of a pressure filter.

This style of machinery is prominently used in a wide variety of industries which employ filtration processes and it generally comprises a filter body within which a plurality of spaced filter leaves are suspended or supported. Each leaf consists of a circular piece of heavy screen, suitably bound on the peripheral edge, and over which a filter cover or bag is slipped, the screen operating as a drain for the filtrate passing through the cover and also serving to prevent the cover from collapsing under the pressure. According to present methods, the filter cover is necessarily sewed on the leaf before the latter is mounted in the main filter, since the space limitations within the latter preclude an attachment of the cover while the leaf is in position. For the same reason, the removal of the cover from the leaf cannot be effected without removing the leaf from the machine, or by destroying the cover. As these covers require periodic washing to restore their porosity, it is obvious that the time consumed and the interruption to the continuity of the process constitutes a serious economic waste. As a partial solution of this problem, it has been suggested that a reserve supply of the leaves with covers already attached be provided, so that complete leaf units may be installed when required and thus avoid the necessity of sewing new covers on the old leaves at the time of change. This method is still wasteful of time in that it requires the removal of the leaves, and is moreover costly since it necessitates an added capital investment in the reserve leaves, these elements being decidedly expensive.

I propose to arrange the filter cover so that it may be attached to and removed from the leaves with ease, dispatch and without injury while the latter are in position in the machine. This achievement is effected without disturbing the filtering capacity of the cover for any given surface and is preferably accomplished through the medium of the so-called "zipper" type of fastener which comprises a plurality of interlockable teeth disposed in facing relation along a pair of meeting edges, the teeth being locked or unlocked in meshing engagement dependent upon the direction of movement of a sliding member. The easy removability of my improved cover permits more frequent and effective washing thereof with an attainment of an increase in the efficiency and life of the filter cover, and a concomitant improvement in the overall efficiency of the main filter.

However, it is within the scope of this invention that other methods of securing the meeting edges of the cover may be adopted, as the generic aspect contemplates the use of a fastener which will secure the cover on the leaf while the latter is in position, or one in which the meeting edges are drawn together by a direct movement.

These and further objects of my invention will be set forth in the following specification, reference being had to the accompanying drawings, and the novel means by which said objects are effectuated will be definitely pointed out in the claims.

In the drawings:

Figure 1 is a sectional elevation of a portion of a filter showing a plurality of filter leaves inserted therein and provided with my improved cover.

Fig. 2 is a section along the line 2—2 of Fig. 1, looking in the direction of the arrows.

Fig. 3 is an enlarged elevation of a filter leaf provided with my improved cover.

Fig. 4 is an edgewise view of the leaf of Fig. 3, looking in the direction of the arrow 4 in said figure.

Fig. 5 is a partial plan view showing diagrammatically the means for securing the cover on the filter leaf.

Figs. 6, 7, 8, 9 and 10 are diagrammatic views showing modified arrangements of my filter cover as applied to different types of filter elements.

Fig. 11 is a section along the line 11—11 in Fig. 3 showing a modified arrangement of the filter cover in the region of the slit thereof.

Fig. 12 shows a suggested manner of detachably engaging the cable to the fastener.

The numeral 20 designates a pressure filter having upper and lower halves 21 and 22, respectively, which are hinged at 23 and secured in operative relation to each other by means of the bolts 24. When the two halves of the casing 20 are secured together, as shown in Fig. 2, the interior thereof is generally cylindrical in shape and the upper half 21 of the casing is provided with a plurality of spaced holes 25, each of which receives a drain nipple 26 of a filter leaf 27. Each nipple 26 is provided with a drain hole 28 which communicates through a pipe 29 with a drain manifold 30 supplied on the exterior of the filter 20. The major portion of the filter leaf 27 is disposed within the casing 20 and is composed of a thin body formed of heavy screen 31 which is bound on its circular periphery by a reenforcing strip 32, said leaf being suspended from the drain nipple 26. For a purpose hereinafter explained, the leaf 27 is also provided with an impervious, shield portion 33 at the junction of the leaf with the nipple 26.

The foregoing structure in and of itself forms no part of the present invention, but has been set forth in detail as illustrative of one type of operative environment with which my improved filter cover may be employed.

The filter leaf above described operates merely as a drain for the filtrate which has passed through the filtering agent and also as a support for the latter. The filtering agent is generally made from a suitable cloth, although it is possible to manufacture from other materials, and in the form illustrated in Fig. 3 partakes of a circular shape for accommodation to the particular type of filter leaf 27 shown. This filter cover, denoted by the numeral 34, is slit semi-circumferentially along the periphery thereof and a plurality of interlockable teeth 35 are secured in facing relation along the meeting edges of the slit from the ends thereof, but terminating at some predetermined distance from each other midway of the ends of the slit. The teeth 35 are fashioned after the so-called "zipper" type of fastener which employs the customary slide member 36 having a wedge portion 37 such that when the member 36 is operated upwardly, as shown in Fig. 4, the teeth 35 will be placed in interlocking relation, and when the member 36 is operated downwardly, as shown in Fig. 5, the teeth 35 will be unlocked and separated to thus permit the withdrawal of the filter cover 34 from the filter leaf 27 by a downward movement, as shown in Fig. 3.

It is contemplated that other types of fasteners may be employed if desired, although the style illustrated has particular advantage in that it permits the closing and separation of the meeting edges of the slit of the cover 34 by simple and direct movement.

After a filter employing a body of filter leaves, as shown in Fig. 1, has been in operation for some time, the unfilterable elements in the solution build up in a cake form 38, and while a certain proportion of this cake may be flushed away while the filter leaf is in position in the casing, yet at periodic times, the filter cover must be entirely removed from the leaf for the purpose of renewal. As noted above, present methods require that the filter leaf be entirely removed from the casing, since the filter covers are sewed on the leaf and the space limitation within the filter casing does not permit of either their attachment to or detachment from the leaf while the latter is in position. However, through utilizing my improved type of filter cover, the latter may be applied to or removed from the leaf without any necessity for dismantling the same from the main filter casing and the method of achieving this desired result will now be described.

A pair of pulleys 39 are placed within the upper half 21 of a casing 20 on opposite sides of and close to the drain nipple 26 of each leaf 27. One or more idler pulleys 40 may also be disposed within the casing adjacent the periphery of each leaf, as shown clearly in Fig. 2. The pulleys 40 function as guides for a cable, or chain, 41 which passes thereover and also around the pulley 39, it being understood that all pulleys to one side of the drain nipple 26 constitute an operative group. The cable 41 is endless and at any desired point thereof, as at 42, may be provided with means for detachable engagement with the sliding member 36 of the fastener.

When it becomes necessary to remove a filter cover for washing or for other purposes, it is only necessary to drop the lower half 22 of the casing 20 and pull downwardly in locations 43 on the cable 41 on opposite sides of the leaf 27. By pulling on the portion of the cable 41 immediately adjacent the periphery of the leaf 27, it will be obvious that the sliding member 36 of the fastener will be pulled down, thus opening the cover on that side. A similar operation on the opposite side of the cover achieves a like result, so that, after the cables 41 are detached from the fastener, the cover 34 may be removed from the leaf by simply pulling downward.

A new cover is applied to the leaf by simply reversing the above mode of operation. Each cover is placed on a leaf and pushed upwardly thereon as far as possible, whereupon the cables 41 are secured to the appropriate sliding members of the fasteners and the portion of each cable remote from the periphery of the leaf 27 is pulled downwardly to cause the sliding member of the fastener to move upwardly, thus securing the cover in position.

The use of the type of fasteners shown is not only highly effective for the purpose indicated, but their close positioning relative to each other along the meeting edges of the slit functions to some extent as a filtering agent. It is contemplated, however, that a flap 44 formed of the same material as the remainder of the filter cover may be attached to one portion 45 thereof, as shown clearly in Fig. 11, and arranged so that when the cover is in position on the leaf, said flap will be disposed immediately below the slit in the cover, thus providing a filtering medium for the full length thereof. As shown in said figure, the flap 44 will be sufficiently wide to entirely bridge the width of the slit and to lie in close engagement with the other portion 46 of the cover in the region of the slit. The purpose of the shield portion 33 on the leaf 27, heretofore noted, is to adequately support the cover at its weakest portion and also to insure that the liquid being filtered will pass through some portion of the filter cover without flowing directly to the leaf. The advantages of the structure above described will be obvious. The filter covers may not only be applied and removed with great rapidity, but this desirable result is effected while the filter leaves are in position in the filter casing. All methods now in use require the removal of these leaves without exception. Moreover, the covers may be used repeatedly after the periodic washings until worn.

In Figs. 6, 7, 8, 9, and 10 are illustrated diagrammatically a variety of filter elements showing a manner in which the respective filter covers may be arranged according to my invention. Fig. 6 pertains to a rotary type of filter using a leaf 54 to which may be attached a fastener of a type heretofore described and arranged as denoted by the numeral 55. In Fig. 7 is shown a filter leaf 56 of the same type as the filter leaf 27, but in which the fastener 57 is disposed along a radius of the leaf on opposite sides thereof. Fig. 8 shows a filter element 48 for a thickener apparatus in which the fastener 49 is disposed along one side thereof. Fig. 9 shows still another form of a filter leaf 50, having a generally rectangular profile, and in which the fastener 51 is arranged along one side thereof. Fig. 10 shows a filter leaf 52 of the same type as 27, in which the fastener 53 is arranged around the lower semi-circumferential periphery of the leaf, as contrasted with a disposition along the upper half thereof as shown in connection with the leaf 27.

My improved filter cover has general application to a variety of apparatus requiring elements of this character and is not restricted in its use to pressure filter types as above described. Accordingly, it may be employed with vacuum filters, those operating under atmospheric pressure, or with the stationary or rotary types of filter generally. The generic construction involved is that of a filter cover which is arranged for rapid attachability and detachability to the appropriate elements of the filter structure without necessitating any disassembly of the same.

While I have shown one set of elements and combinations thereof for effectuating my improved filter cover, it will be understood that the same is intended for purposes of illustration only and in nowise to restrict my device to the exact forms and structures shown, for many changes may be made therein without departing from the spirit of my invention.

I claim:

1. The combination of a filter casing, a filter leaf positioned therein, a filter cover including an opening enclosing said leaf, means on said cover operable in one direction to draw the meeting edges of said opening toward each other and in the other direction to separate said edges to permit the withdrawal of the cover, and means on said casing connectable to said first named means for operating the same while said leaf is in position.

2. The combination of a filter casing, a filter leaf positioned therein, a filter cover including an opening for enclosing said leaf, means on said cover operable in one direction to draw the meeting edges of said opening toward each other and in the other direction to separate said edges to permit the withdrawal of the cover, a pulley fixed in said casing, and a cable operable over said pulley and connectable to said means for moving the same while said leaf is in position.

3. The combination of a filter casing, a filter leaf positioned therein, a filter cover including an opening for enclosing said leaf, means on said cover operable in one direction to draw the meeting edges of said opening toward each other and in the other direction to separate said edges to permit the withdrawal of the cover, a pulley fixed in said casing, a cable operable over said pulley and connectable to said means for moving the same while said leaf is in position, and means for guiding said cable.

4. The combination of a filter casing, a filter leaf positioned therein, a filter cover including an opening for enclosing said leaf, means on said cover operable in one direction to draw the meeting edges of said opening toward each other and in the other direction to separate said edges to permit the withdrawal of the cover, a pulley fixed in said casing, a cable operable over said pulley and connectable to said means for moving the same while said leaf is in position, and one or more idler pulleys positioned in said casing for guiding said cable.

5. The combination of a filter casing having a cylindrical interior, a filter leaf of corresponding profile positioned therein, a filter cover including an opening for enclosing said leaf, means on said cover operable in one direction to draw the meeting edges of said opening toward each other and in the other direction to separate said edges and permit the withdrawal of the cover, a pulley fixed in said casing, a cable operable over said pulley and connectable to said means for moving the same while said leaf is in position, and means for guiding said cable along the periphery of said leaf.

6. The combination of a filter casing having a cylindrical interior, a filter leaf of corresponding profile positioned therein, a circular filter cover including a semi-circumferential slit defining an opening for enclosing said leaf, a pair of means disposed along the facing edges of the opening from the ends thereof but terminating midway of said ends, said means being operable in one direction to draw the facing edges of the opening towards each other and in the other direction to separate said edges and permit the withdrawal of the cover, a pair of pulleys fixed in said casing, and a pair of cables each operable over one of said pulleys and connectable to the adjacent means for moving the same while said leaf is in position.

7. The combination of a filter casing having a cylindrical interior, a filter leaf of corresponding profile carried therein, a filter cover including an opening for enclosing said leaf, means on said cover operable toward the point of carriage of said leaf to draw the meeting edges of said opening toward each other and in the opposite direction to separate said edges and permit the withdrawal of the cover, a pulley fixed in said casing, a cable operable over said pulley and connectable to said means for moving the same while said leaf is in position, and means for guiding said cable along the periphery of said leaf.

8. The combination of a filter casing having a cylindrical interior, a filter leaf of corresponding profile suspended therein, a filter cover including an opening for enclosing said leaf, means on said cover operable toward the point of suspension of said leaf to draw the meeting edges of said opening toward each other and in the opposite direction to separate said edges and permit the withdrawal of the cover, a pulley fixed in said casing, a cable operable over said pulley and connectable to said means for moving the same while said leaf is in position in said casing, and means for guiding said cable along the periphery of said leaf.

In testimony whereof, I have subscribed my name.

CHARLES A. FRANKENHOFF.